United States Patent [19]

Hayward

[11] 4,055,389
[45] Oct. 25, 1977

[54] DIE CONSTRUCTION

[75] Inventor: Glenn L. Hayward, Chippewa Falls, Wis.

[73] Assignee: Leesona Corporation, Warwick, R.I.

[21] Appl. No.: 708,615

[22] Filed: July 26, 1976

[51] Int. Cl.² .............................................. B29F 3/04
[52] U.S. Cl. ..................................... 425/466; 425/381
[58] Field of Search ...................... 219/73, 136, 137 R, 219/137 WM; 425/461, 466, 376, 381, 378, 379

[56] References Cited

U.S. PATENT DOCUMENTS

| 1,511,555 | 10/1924 | Yngve | 425/461 X |
| 3,377,655 | 4/1968 | Kucharski et al. | 425/466 |
| 3,884,611 | 5/1975 | Anderson et al. | 425/466 X |

FOREIGN PATENT DOCUMENTS

| 2,239,021 | 1/1973 | Germany | 219/73 R |

Primary Examiner—Francis S. Husar
Assistant Examiner—Mark Rosenbaum
Attorney, Agent, or Firm—Robert J. Doherty

[57] ABSTRACT

This invention is directed to a bi-metallic die construction in which one of the die components includes a plastic flow channel formed essentially entirely in a face layer of metal which has been deposited by submerged arc welding techniques upon a base block of a metal having dissimilar characteristics therefrom. Generally the face layer metal is a hard, abrasion resistant and difficult to machine and accordingly relatively expensive metal such as stainless steel while the base component metal is formed of a more easily machineable less expensive metal such as hot rolled steel. The resultant die structure combines the benefits of lowered cost and heightened flexibility in the selection of various face materials for specific die use purposes.

7 Claims, 4 Drawing Figures

DIE CONSTRUCTION

BACKGROUND OF THE INVENTION

Die structures including those particularly adapted for the extrusion of thermoplastic sheet materials with which this invention is more particularly involved are generally well known and either take the form of a thin and generally hard wear resistant coating upon the finished die cavity surfaces or that of a two component die structure in which one of the components includes the die cavity and wherein the two separate components thereof are securely fastened to each other. An example of the first type is the wear resistant surface treatment shown by U.S. Pat. No. 3,895,899 issued July 22, 1975 wherein working surfaces of an extrusion die hardened by a difusion process in which surface thereof is hardened by the formation of nitride or boride layers therein. Other examples of the surface hardening techniques include formation of chromium or stainless steel coatings by conventional techniques to provide an abrasion resistant layer or coating on the already formed final surface configuration of a die component. Surface preparation preliminary to such known application techniques is however critical as is the necessity of insuring the receipt of a coating of at least some minimal thickness over the flow path area thereof. Furthermore with such surface preparation techniques it is necessary to reapply such when the die surface has need for refinishing as caused from nicks or periodic wear.

It would accordingly be desirable to be able to form the configuration of the ultimate flow path die configuration in a material having the necessary wear and hardness characteristics to better withstand the flow and abrasion of thermo plastic polymers thereacross and in some fashion connect such finally dimensioned die component to a backup surface of more easily machineable and lower cost material from which the remaining portions of the die configuration may be formed, including those die configurations having flexible die lips for varying the thickness of the exit lip of a sheet forming die wherein considerable machining for the formation of a relatively thin connecting web of metal within the die is required as will hereinafter be more fully apparent. Towards these ends, attempts were made to utilize separate layered die constructions such as those shown in U.S. Pat. No. 2,932,551 issued Apr. 12, 1960; U.S. Pat. No. 3,277,529 issued Oct. 11, 1966 and U.S. Pat. No. 2,879,676 issued Mar. 31, 1959. Extrusion dies incorporating such wherein the polymer flow path was formed in one layer and then the layers joined are certainly operative, but present problems mainly centered about the manner in which the separate die portions are joined. Thus the base and the top blocks of such bimetallic die constructions have to be very carefully machined so as to present as close as possible parallel surfaces. Furthermore holes have to be tapped in both blocks so that bolts may physically be used to hold the separate blocks together. Such requires a great deal of machining and construction time and even after careful preparation, necessarily results in a construction in which there is an air gap between the two blocks and no matter how slight, can result in uneven heating distribution. It would be accordingly desirable to make use of such separate bimetallic layered die constructions if the difficulties now present in joining such separate components together were eliminated or at least reduced or if desirable die component heating distribution could be achieved.

It is accordingly an object of the present invention to provide a die of bimetallic construction wherein the configuration of the flow channel portions thereof are formed within and that face layer is permanently welded to a base block of more easily machinable and less costly material.

A further object of the present invention is the formation of a die construction particularly adapted for the extrusion thin sheet thermoplastic material wherein the face layer as above indicated is initially and progressively formed by weld attachment to the base block prior to the formation of the flow channel configuration therein.

A further object of the present invention is the formation of a die specifically adapted for the extrusion of sheet thermoplastic sheet material of the types above explained in which dissimilar characteristics of the metal making up the face and base layers or components thereof can be chosen so as to increase the usage flexibility of the die and decrease the cost thereof.

The present invention accomplishes these aims while avoiding those prior art shortcomings above indicated by the provision of a die and its method of construction which is specifically adapted for the extrusion of thermoplastic materials comprising a plurality of metal die components positioned in face-to-face relationship to a plastic flow channel formed therebetween wherein at least one of the die components includes a surface face layer of a relatively thick weld deposited metal having characteristics dissimilar from those of its base and wherein the configuration of said plastic flow channel of said one component is formed essentially entirely in said surface face layer.

These and other objects of the invention will be brought out in the following descriptive portions of the application:

DESCRIPTION OF THE PREFERRED EMBODIMENT

Figure 3:
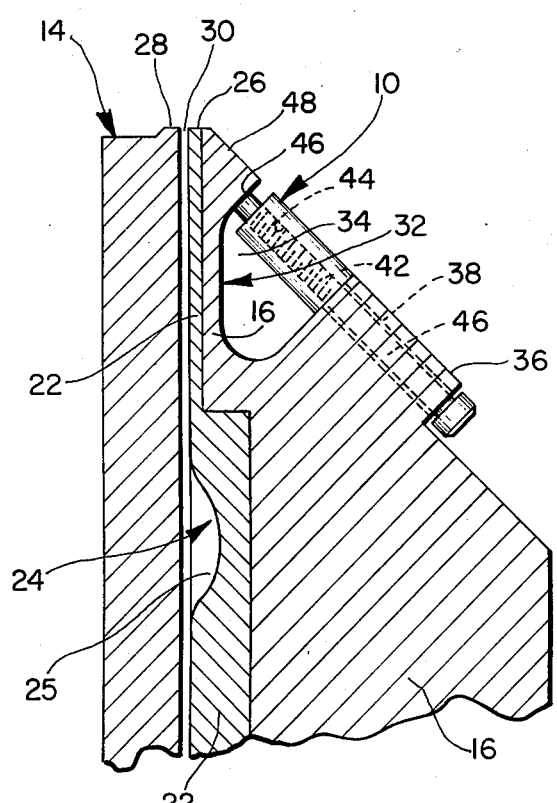
FIG. 3 is a side sectional view of both halves of an extrusion die especially adapted for the extrusion of thin sheet thermoplastic material showing in particular the manner in which the flow channel of one of the die components is formed essentially entirely in a face layer thereof.

Turning now to the drawing and particularly FIG. 3 thereof, there is shown in a somewhat stylized and simplified form one die component 10 of an overall die structure 12 formed by the juxtaposition of the die component 10 with a further die component 14. The die component 10 comprises a base block 16 of generally easily machinable material such as hot rolled steel into which a slot 18 the width of the die ultimate extrusion slot has been formed. The slot 18 may also include an enlarged slot portion 20 for receipt of the distribution portion of the ultimate die extrusion channel as will more clearly be hereinafter evident. The slot 18 is prepared for receipt of a face layer 22 of a metal having characteristics dissimilar from that comprising the base block 16. The permanent attachment of the face layer 22 to the slot in the configuration shown is by means of weld depositing techniques.

Those welding deposit procedures known as the submerged arc process have been found to be particularly feasible in the formation of the present die construction. Such submerged arc techniques are commercially known and are further described in bulletin no. H210 published by Lincoln Electric Company, Cleveland, Ohio, 44117, February, 1975. Any of the techniques described are found on pages 18-22 of such publication may be utilized after proper surface preparation also described therein to progressively deposit the face layer 22 to the base block 16. The particular type of material to be weld deposited and thus form the face layer 22 is a matter of selection for the properties desired in the resultant flow channel of the die component 10. However, generally hard abrasion resistant materials such as 316 or 420 stainless steels when applied to a 1018 hot roll steel die block 16 have met with particular success. The submerged arc weld depositing techniques above referred to, enable the face layer 22 to be permanently or attached to the base block 16 to form a dense coherent layer which may be machined otherwise treated as if it was the material forming the entire die component 10 rather than the face layer 22 thereof. In this way then the final configuration of the thermoplastic extrusion channel may be defined therein by machining, polishing etc. as is conventional in the art and the configurations necessary to form the supportive portions of the die component 10 formed in the more easily machinable material forming the base block 16. This results in considerable machining time savings, as well as enabling a higher degree of materials selection choices for the metal forming the flow channel portions of the die.

Figure 1:
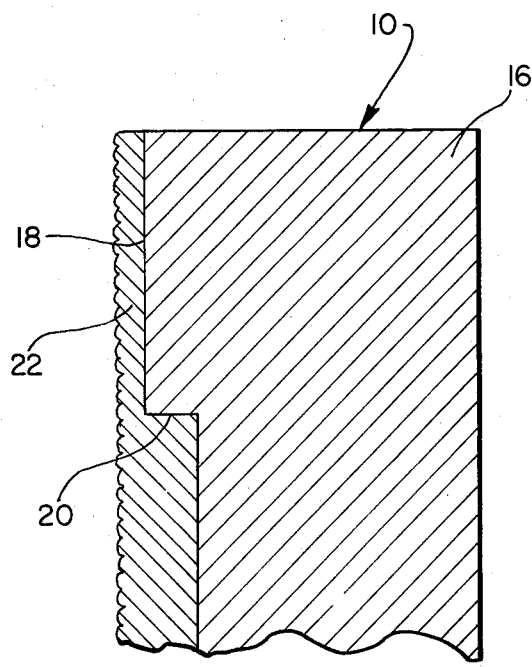
FIG. 1 is a cross sectional view of one die half of an extrusion die showing a face portion on to which a face layer of metal has been deposited by submerged arc welding techniques.
Figure 2:
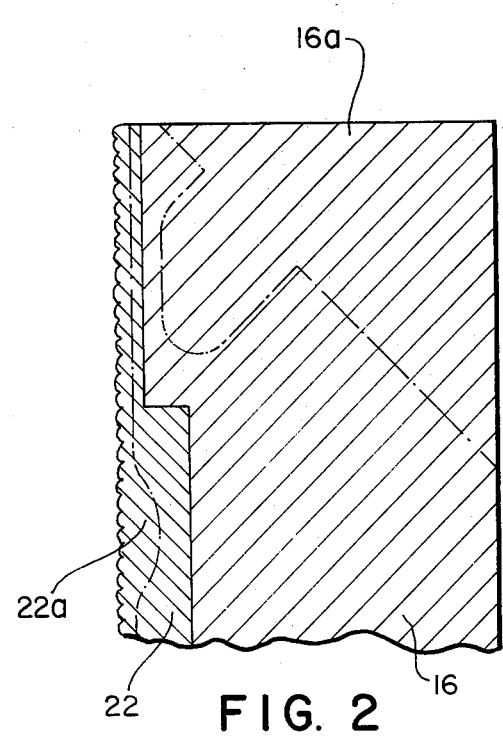
FIG. 2 is a similar sectional view as that shown in FIG. 1 but wherein the ultimate configuration of the die component is shown in phantom.

Turning now to the FIG. 2 of the drawing, the configuration of the ultimate die component 10 is shown in phantom line representation superimposed upon the composite starting block comprising base block 16 and face layer 22 as shown in FIG. 1. Thus in the ultimate configuration of the die component 10, that portion of the base block indicated as 16a would be removed as would that portion 22a of the face layer 22. Such removal would be effected by normal machining techniques, it being clear that considerable time saving would be achieved by machining the softer metal of base block 16 than if the entire die was formed of the material of face layer 22 needed to withstand the abrasion in the flow channel portions thereof.

The particular die construction 12 in which the present invention is preferably utilized is best shown in FIG. 3 of the drawing. Therein die halves 10 and 14 are positioned in relationship to each other by a series of bolts (not shown) and are appropriately machined to form a polymer flow channel 24 including a die throat distribution area 25 and an exit slot 30 for polymer to be extruded under pressure into a final form as determined by the shape of the die lips 26 and 28. The die lip 26 of die component 10 may be adjusted so that the final dimension of the material being extruded from the exit slot 30 thereof may be varied. Thus die lip 26 is integrally supported from the remaining portions of the die component 10 by a material web 32 of reduced thickness, appropriately machined and resulting in an enlarged channel 34 in the base block 16. The boss 36 which partially defines such channel 34 is provided with a series of bores 38 passing therethrough and into which adjusting bolts 40 having threaded lower portions 42 are mounted. An adjustment block 44 is threadably engaged to the lower portion 42 of each adjusting bolt 40 which in turn terminates at an end portion 46 in abutting contact with the rear portions 48 of the lip 26. It should be brought out that many such exit slot adjusting means are generally provided along the width of the die structure. Such constructions are conveniently used to control the exact dimension of the product being extruded and are commercially available e.g. from Johnson Plastics Machinery, Chippewa Falls, Wis. 54729 under the trademark designation Flex-Lip.

Figure 4:
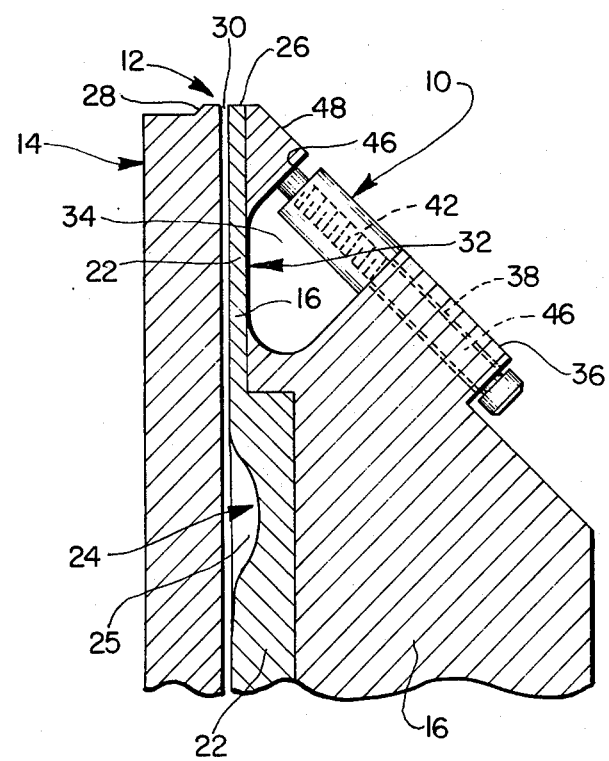
FIG. 4 is a sectional view similar to FIG. 3 of the drawing but showing a variation thereof wherein a connecting web supporting a flexible lip of the die exit slot of the die component is entirely formed within the weld deposited face layer.

The die configuration shown in FIG. 3 of the drawing includes an integral web portion 32 which is comprised of portions of the face layer 22 and the block 16. However, in those cases when the characteristics of the metal forming the face layer 22 and the base block 16 are considerably different in their reaction to flexure, it has been found that repeated flexure of the die lips 26 can lead to a cracking of the web 32. This appears to happen since the softer and thus more easily machinable base block 16 material (such as hot rolled steel) will not or has a tendency not to return to its original unflexed position as quickly as the harder e.g. stainless steel face layer deposit 22 to such an extent that internal stresses are set up in such a composite web 32. Thus in such cases the composite block is machined so that the web 32 otherwise subject to such flexure stresses is formed entirely from the face layer material 22. Such configuration is shown as an alternate embodiment of FIG. 4 of the drawing. However in those cases where a relatively soft metal such as nickel is used to comprise the face layer 22, the metal forming the face component 22 and the metal forming the base block 16 (i.e. hot rolled steel) portions of the web 32 tend to flex and retract at the same rate and accordingly the cracking problem above referred to would not be evident or as serious.

It is accordingly believed that a novel die construction is herein presented which avoids the prior art shortcomings discussed herein and which accomplishes the objectives of the invention in a straightforward manner and that the resultant die configuration is one that can be tailor made to all specific purposes and which lends itself to less expensive manufacturing techniques. Although various reference to various specific metals for forming the face layer 22 and the base block 16 have been indicated above it should be pointed out that any variety of metals having characteristics dissimilar in some desirable characteristic may be utilized and that at the above specific metals are cited as illustrative rather than restrictive.

While there is shown and described herein certain specific structure embodying the invention, it will be manifest to those skilled in the art that various modifications of the parts may be made without departing from the spirit and scope of the underlying inventive concept and that the same is not limited to the particular forms herein shown and described except insofar as indicated by the scope of the appended claims.

What is claimed is:

1. A die for the extrusion of thermoplastic materials comprising a plurality of metal die components positioned in face-to-face relationship to define a plastic flow channel having an exit slot for the extrusion of sheet material, at least one of said components being of bimetallic construction and having a relatively thick integral surface face layer of a metal having characteristics dissimilar from those of its underlying base, the configuration of said plastic flow channel in said one component formed essentially entirely in said surface face layer, an exit lip formed in said one die component, said exit lip in part defining said exit slot and connected to the main body of said die component by means of a connecting web, said exit lip movable about said web towards and away from the lip of the other of said die components so as to vary the thickness of said exit slot wherein at least a cross sectional portion of said web is essentially entirely formed from said surface face layer.

2. The die construction of claim 1, said surface face consisting of a weld deposited metal layer.

3. The die construction of claim 2, said weld deposited metal layer and said base metal material having dissimilar stress characteristics under flexure.

4. The die construction of claim 3, said surface layer consisting of a hard stainless steel and said base material consisting of a relatively easily machinable hot rolled steel.

5. A die for the extrusion of thermoplastic materials comprising a plurality of metal die components positioned in face-to-face relationship to define a plastic flow channel having an exit slot for the extrusion of sheet material, at least one of said components being of bimetallic construction and having a relatively thick integral surface face layer of a metal having characteristics dissimilar from those of its underlying base, the configuration of said plastic flow channel in said one component formed essentially entirely in said surface face layer, an exit lip formed in said one die component, said exit lip in part defining said exit slot and connected to the main body of said die component by means of a connecting web, said exit lip movable about said web towards and away from the lip of the other of said die components so as to vary the thickness of said exit slot wherein at least a cross sectional portion of said web includes face layer and base material portions and wherein the metals forming said face layer and said base material have similar stress characteristics under flexure.

6. The die construction of claim 5, said face layer consisting of a relatively soft nickel steel alloy and said base material consisting of a relatively easily machinable hot rolled steel.

7. The die construction of claim 6, said surface face consisting of a weld deposited layer.

* * * * *